United States Patent
Moore

(10) Patent No.: US 8,521,437 B2
(45) Date of Patent: Aug. 27, 2013

(54) SPATIAL INTERPOLATION OF IRREGULARLY SPACED SEISMIC DATA

(75) Inventor: Ian Moore, Mosman Park (AU)

(73) Assignee: WesternGeco L.L.C., Houston, TX (US)

( * ) Notice: Subject to any disclaimer, the term of this patent is extended or adjusted under 35 U.S.C. 154(b) by 414 days.

(21) Appl. No.: 12/740,461

(22) PCT Filed: Oct. 27, 2008

(86) PCT No.: PCT/GB2008/003617
§ 371 (c)(1),
(2), (4) Date: Aug. 12, 2010

(87) PCT Pub. No.: WO2009/066047
PCT Pub. Date: May 28, 2009

(65) Prior Publication Data
US 2010/0299069 A1    Nov. 25, 2010

(30) Foreign Application Priority Data

Nov. 19, 2007   (GB) .................................. 0722651.7

(51) Int. Cl.
*G01V 1/48*  (2006.01)
*G01V 1/00*  (2006.01)
*G01V 1/28*  (2006.01)

(52) U.S. Cl.
USPC ............................................. 702/14; 702/17

(58) Field of Classification Search
USPC ..................................... 702/14, 17
See application file for complete search history.

(56) References Cited

U.S. PATENT DOCUMENTS

| 6,510,390 | B1 | 1/2003 | Bunting et al. | |
|---|---|---|---|---|
| 7,181,347 | B2* | 2/2007 | Moore | 702/14 |
| 7,791,980 | B2* | 9/2010 | Robertsson et al. | 367/24 |
| 2004/0141355 | A1 | 7/2004 | Robertsson et al. | |
| 2006/0227657 | A1 | 10/2006 | Tveide et al. | |
| 2006/0239117 | A1 | 10/2006 | Singh et al. | |
| 2006/0291328 | A1 | 12/2006 | Robertsson et al. | |
| 2008/0225642 | A1 | 9/2008 | Moore et al. | |
| 2009/0003132 | A1* | 1/2009 | Vassallo et al. | 367/75 |
| 2010/0312481 | A1 | 12/2010 | Moore | |
| 2010/0329077 | A1 | 12/2010 | Ozbek et al. | |

FOREIGN PATENT DOCUMENTS

| EP | 1879052 | A2 | | 1/2008 |
|---|---|---|---|---|
| FR | 2884930 | A1 | | 10/2006 |
| GB | 2256048 | A | * | 11/1992 |
| GB | 2444953 | A | | 6/2008 |

(Continued)

OTHER PUBLICATIONS

Chen et al., "Analysis of error in reconstruction of two-dimensional signals from irregularly spaced samples," IEEE Transactions on Acoustics, Speech and Signal Processing, 1987, vol. ASSP-35(2): pp. 173-180.

(Continued)

*Primary Examiner* — Michael Nghiem
*Assistant Examiner* — Alexander Satanovsky

(57) ABSTRACT

A method for spatially interpolating pressure values of seismic data uses known values of pressure and spatial derivatives of pressure at a plurality of irregularly spaced locations along the direction of interpolation. The interpolation preferably uses an interpolation operator calculated by assuming that an interpolated pressure value comprises a linear combination of the known pressure values at locations $x_i$ and the spatial derivatives at locations $X_\alpha$, with operator coefficients $w_i$ and $w_\alpha$ respectively, and calculating the coefficients by minimizing an error function.

18 Claims, 11 Drawing Sheets

(56) References Cited

FOREIGN PATENT DOCUMENTS

| WO | 02073239 A1 | 9/2002 |
|---|---|---|
| WO | 2005114258 A1 | 12/2005 |
| WO | 2008014080 A2 | 1/2008 |
| WO | 2009066049 A1 | 5/2009 |

OTHER PUBLICATIONS

Ozbek et al., "Anti-alias optimal interpolation with priors," 72nd EAGE Conference and Exhibition incorporating SPE EUROPEC, 2010, Barcelona, Spain: pp. 1-5.

Ozdemir et al., "G025: Interpolation of irregularity sampled data by matching pursuit," 70th EAGE Conference and Exhibition, Rome, Italy, Jun. 2008: pp. 1-5.

Robertsson et al., "On the use of multicomponent steamer recordings for reconstruction of pressure wavefields in the crossline direction," Geophysics, 2008, vol. 73(5): pp. A45-A49.

Yen, "On nonuniform sampling of bandwidth-limited signals," IRE Transactions on Circuit Theory, 1956, vol. 3: pp. 251-257.

Combined Search and Examination Report of British Application No. GB 0722651.7 dated Mar. 10, 2008: pp. 1-5.

International Search Report and Written Opinion of PCT Application No. PCT/GB2008/003617 dated Sep. 7, 2010: pp. 1-12.

Combined Search and Examination Report of British Application No. GB 0722651.1 dated Mar. 4, 2008: pp. 1-6.

International Search Report and Written Opinion of PCT Application No. PCT/GB2008/003713 dated Feb. 10, 2009: pp. 1-15.

* cited by examiner

SPATIAL INTERPOLATION OF IRREGULARLY SPACED SEISMIC DATA

FIELD OF THE INVENTION

The present invention relates to the spatial interpolation of seismic data, and particularly to the interpolation of data when known values are irregularly spaced.

BACKGROUND TO THE INVENTION

Seismic data are typically gathered using an array of detectors. In the case of marine data, hydrophones measure pressure fluctuations in the water caused by incoming seismic waves. Geophones measure vector quantities such as displacement, velocity or acceleration. In the case of marine data, a plurality of cables or streamers, which are spaced apart typically by about 100 metres, are towed behind a boat. Each cable has detectors spaced along the cable at intervals. In the case of land data, a geophone array is laid out on the ground with the geophones in an approximate grid formation. The detector array detects seismic signals from reverberations of a signal from a seismic source, such as an airgun for marine data. However, the detectors will not be exactly regularly spaced in the array. In particular, in the case of marine data, the cables drift and so spacing between the cables becomes irregular and changes the distances between the cables and the offsets of the detectors from the source. In Ocean Bottom (OBC or OBS) acquisition, a detector array is fixed on the sea bed. The source may be an airgun mounted on a boat.

Often, in the processing of seismic data it is necessary or desirable to spatially interpolate data. This may be because there are obstacles to the acquisition such as man made or topological obstacles in land data or structures such as an oil rig in marine data, or there may be gaps in the acquisition due to instrument failure. It also may be desirable to interpolate the data simply to decrease the sampling intervals for future processing steps and to increase the resolution. There are cost considerations and other practical considerations which limit the number of receivers which can be deployed in acquisition. In particular, in the acquisition of marine data, there is a practical limit to how closely spaced the cables or streamers may be without risk of entanglement. It therefore may be desirable to obtain extra lines of data intermediate between the streamers by interpolation.

It also may be desirable to simplify future processing steps to "regularise" data ie to take irregularly spaced data and interpolate to shift the data points to be regularly spaced.

Yen, J. L., (On Nonuniform Sampling of Bandwidth-Limited Signals, IRE Transactions on Circuit Theory 1956, 3, 251-257) discloses methods for interpolating non-uniformly sampled signals and in particular Yen's fourth theorem can be applied to the interpolation of seismic data. However, this method has its limitations due to aliasing. Chen, David Shi and Allebach, Jan P., 1987, "Analysis of Error in Reconstruction of Two-Dimensional Signals from Irregularly Spaced Samples", IEEE Transactions on Acoustics, Speech and Signal Processing, 35, 173-180 discloses an extension to Yen's fourth theorem.

Recent developments, in marine acquisition record not only the pressure using hydrophones but also record particle velocity or acceleration in directions parallel to the surface.

SUMMARY OF THE INVENTION

Accordingly, the present invention provides a method for spatially interpolating pressure values of seismic data using known values of pressure and spatial derivatives of pressure at a plurality of irregularly spaced locations along the direction of interpolation.

By use of the spatial derivatives, or gradients of the pressure, the aliasing problem can be greatly reduced. The pressure values may be derived from hydrophone readings (for marine data), and the spatial derivatives of pressure may be derived from measurements of particle velocity or acceleration in the direction of interpolation.

Preferably, the interpolation comprises applying an interpolation operator calculated by assuming that an interpolated pressure value comprises a linear combination of the known pressure values at locations x, and the spatial derivatives at locations, with operator coefficients $w_i$ and $w_\alpha$, respectively, and calculating the coefficients by minimising an error function.

The calculation does not assume the same positions for the pressure readings and the pressure gradients. In general the sensors may be in the same positions, but even then there may be defective sensors which means values of pressure or gradient may be missing at some locations.

In a preferred embodiment, a least squares method is used to minimise the error function. However, for example, an L-1 method may be used instead of an L-2 (least squares) method.

Preferably, the operator is calculated to include a factor relating to the noise level in the known values. In the final operator, the effect of this is that the higher the noise in the pressure data, the more weight is given to the gradient data in performing the interpolation and vice versa.

In one embodiment, the direction of interpolation is substantially perpendicular to a cable connecting a plurality of geophones/hydrophones. Thus, the method can be used to interpolate extra lines of data, thus simulating the use of more closely spaced cables. In the case of marine data acquired using a plurality of substantially parallel streamers having hydrophones spaced along each streamer, and the method is used to interpolate data points between the streamers, thus simulating the use of more closely spaced streamers in the acquisition.

In one embodiment, the values of pressure and spatial derivatives of pressure are moveout corrected values of pressure, and spatial derivatives of moveout corrected pressure values. Moveout correction is when a velocity function is used to transform the seismic traces along a time axis, to compensate for an offset between source and receiver. Moveout correction is often applied before interpolation of seismic data such as shot gathers, to reduce abasing. It is not necessary that the moveout function completely compensates for the offset, just that the data are transformed sufficiently to reduce the aliasing effects. Often, a velocity function is used which is faster than a velocity function for full correction, so that, looking at a shot gather, the slope of the events is reduced but not corrected to be completely flat. As the moveout is "backed off" after interpolation, there is no need for the function to compensate accurately for offset.

Preferably, calculating the spatial derivatives of moveout corrected pressure values from the known values of pressure and spatial derivatives of pressure comprises:
applying a moveout correction function to the spatial derivative data; and
adding a correction term dependent on a moveout corrected time-derivative of the pressure data and a spatial derivative of the moveout correction function.

Preferably, the method comprises the steps of:
a) computing a time-derivative of the pressure data by differentiation of the pressure data;

b) applying the moveout correction function to the time-derivative of the pressure data;

c) computing the spatial derivative of the moveout function;

d) multiplying the results of steps (b) and (c);

e) applying the moveout correction function to the spatial derivative data; and f) adding the results of steps (d) and (e) to obtain the spatial derivatives of moveout corrected pressure values.

In one embodiment, the moveout function is a hyperbolic function. Preferably, the known pressure data are in the form of raw shot gathers. Preferably, the spatial derivatives are calculated from raw measurements of surface particle velocity or acceleration.

In one embodiment of the present invention, the spatially interpolated pressure values of the seismic data may be used to determine physical properties of the earth's interior.

BRIEF DESCRIPTION OF THE DRAWINGS

Preferred embodiments of the present invention will now be described with reference to the accompanying drawings, in which.

DETAILED DESCRIPTION

Figure 1:
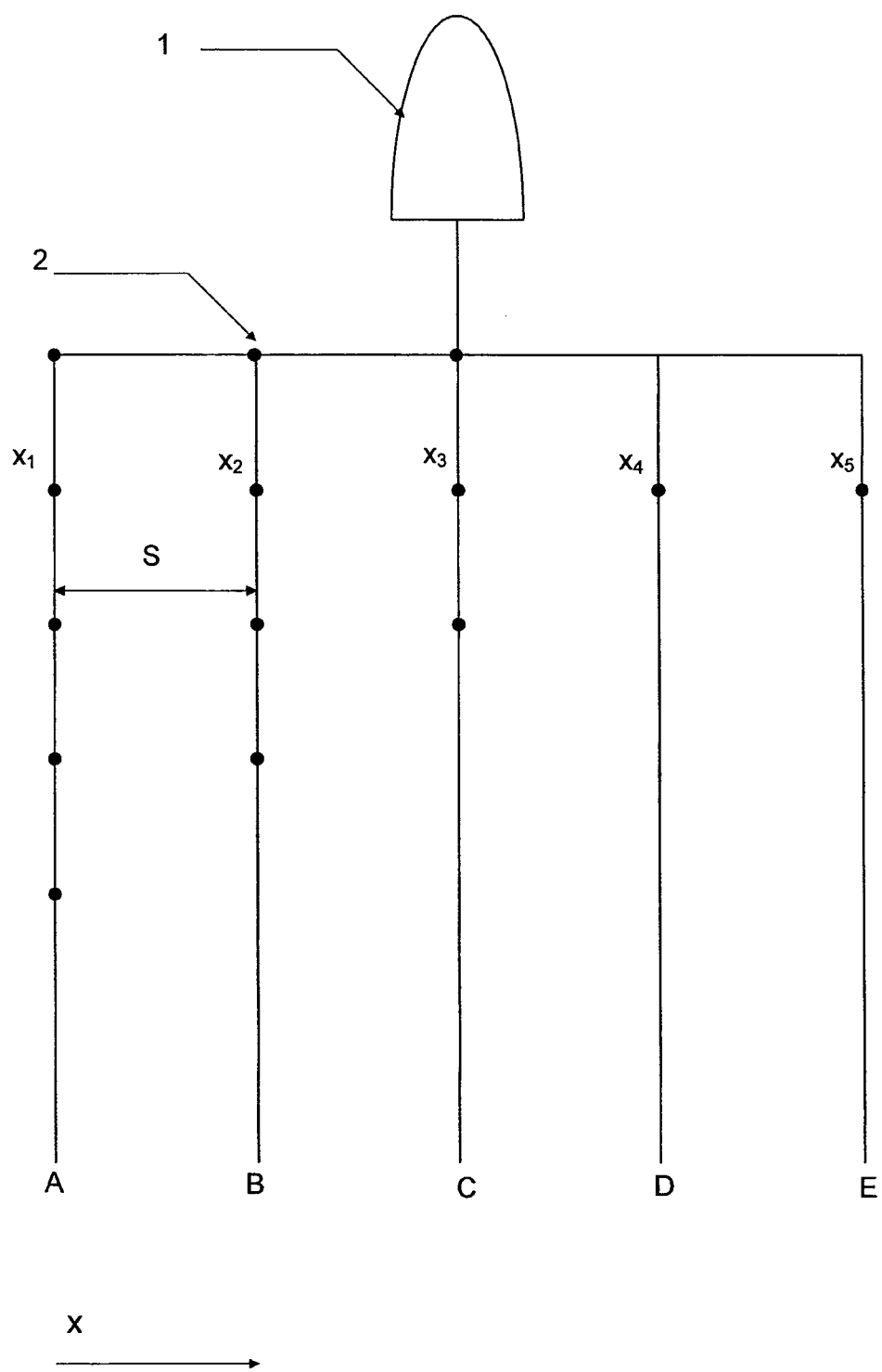
FIG. 1 shows schematically the layout of a marine seismic data acquisition system.

FIG. 1 illustrates a typical layout of an acquisition system for marine seismic data. A plurality of streamers, in this case five streamers A, B, C, D, E are towed behind a boat 1. The typical spacing S between the streamers A, B, C, D, E is 50 to 100 meters although the streamers A, B, C, D, E are only fixed at the end adjacent to the boat and therefore will drift so that spacing S becomes non-uniform, particularly towards the free ends of the streamers A, B, C, D, E. Each streamer A, B, C, D, E has a plurality of sensors 2 equally spaced along the length of the streamer. At each sensor position a hydrophone records pressure changes which correspond to seismic signals from reverberations from a shot fired by a source. At each sensor position $x_n$, at least one sensor records particle velocity or acceleration. There may be multiple velocities/acceleration sensors recording the velocity/acceleration in different directions. In this case, the value of interest is the velocity/acceleration reading in the x direction, i.e. substantially perpendicular to the streamer direction.

Velocity or acceleration readings can readily be converted to pressure gradient, in this case the pressure gradient of interest being $\partial P/\partial x$. This can be calculated from acceleration data by the simple application of Newton's second law:

$$\partial P/\partial x = -\rho a$$

where $\rho$ is the water density and $a$ is the x-component of acceleration.

If the sensors measure the particle velocity these can readily be converted to acceleration values because the data is typically well sampled (for example every 2 ms) in the time direction and so the acceleration can readily be derived by differentiation.

The locations of the pressure readings and the pressure gradients may be the same. However, even if the sensors are located at the same location, in the case of instrument failures, pressure and/or gradient information may be missing at one or more locations and therefore the locations of the pressure values and the pressure gradient values are not necessarily the same. Furthermore, it may be desirable to place the velocity/acceleration sensors more closely than the pressure sensors to remove noise that would otherwise be aliased. In the processing, interpolation may use the finely spaced values, or the velocity/acceleration value may be interpolated to the same spacing as the pressure values, and then the pressure data may be interpolated using co-located measurements. The following treatment therefore does not assume the locations are the same. However, all of the pressure values and pressure gradients used to derive an interpolated value should be consistent with a single underlying wavefield, such as being data from the same shot.

Suppose (in 1D) that we have pressure data at locations $\{x_i; i=1, \ldots, n_d\}$ and gradients at locations $\{x_\alpha; \alpha=1, \ldots, n_g\}$. Note the use of different subscripts for the locations of the data and gradients, respectively, so that the locations where the gradients are recorded need not be the same as those where the data are recorded.

Suppose we wish to interpolate the data to a location y. Assume that the interpolated datum at y is a linear combination of the irregular data and the gradients, with coefficients $w_i$ and $w_\alpha$ respectively (the operator). Consider the interpolation of a function $d(x)$ in the presence of noise. The operator is designed such that the error, $$\epsilon_n = \Sigma_i w_i [d(x_i) + n_i] + \Sigma_\alpha w_\alpha [d(x_\alpha) + n_\alpha] - d(y)$$

is small for all functions $d(x)$ of interest. In the above, $n_i$ and $n_\alpha$ are the noise in the recorded data and derivatives, respectively.

Consider the family of functions:

$$d(x) = \sqrt{2} \cos(kx + \phi)$$

such that $$\epsilon_n = w_i(C_i + n_i) + w_\alpha(-kS_\alpha + n_\alpha) - C$$

where $C_i = \sqrt{2}\cos(kx_i + \phi)$, $S_\alpha = \sqrt{2}\sin(kx_\alpha + \phi)$, $C = \sqrt{2}\cos(ky + \phi)$ and summation is implied by repeated subscripts.

The expected value of the squared error is given by $$\epsilon^2(k,\phi) = E[\epsilon_n^2] = E[w_i w_j (C_i + n_i)(C_j + n_j) + w_\alpha w_\beta (-kS_\alpha + n_\alpha)(-kS_\beta + n_\beta) + C^2 + 2w_i w_\alpha (C_i + n_i)(-kS_\alpha + n_\alpha) - 2w_i (C_i + n_i) C - 2w_\alpha(-kS_\alpha + n_\alpha) C]$$

where E[...] denotes expected value. Assuming that the noise is uncorrelated at different locations, and that the noise in the data is uncorrelated with that in the derivative even at the same location, then $$\epsilon^2(k,\phi)=w_iw_j(C_iC_j+N\delta_{ij})+w_\alpha w_\beta(k^2S_\alpha S_\beta+\lambda N\delta_{\alpha\beta})+C^2-2w_iw_\alpha kC_iS_\alpha-2w_iC_iC+2w_\alpha kS_\alpha C$$

where $N$ and $\lambda N$ are the noise variances in the data and derivatives, respectively.

Given the identities $$\int \cos(a+\phi)\cos(b+\phi)d\phi=\pi \cos(a-b)$$

$$\int \cos(a+\phi)\sin(b+\phi)d\phi=-\pi \sin(a-b)$$

$$\int \sin(a+\phi)\sin(b+\phi)d\phi=\pi \cos(a-b)$$

wherein the range of integration is $0\leq\phi\leq 2\pi$, the phase-averaged error spectrum is given by $$\varepsilon(k)^2 = (2\pi)^{-1}\int \varepsilon^2(k,\varphi)d\varphi$$
$$= w_iw_j\left\{\begin{array}{c}\cos(k\Delta_{ij})+\\ N\delta_{ij}\end{array}\right\}+w_\alpha w_\beta\left\{\begin{array}{c}k^2\cos(k\Delta_{\alpha\beta})+\\ \lambda N\delta_{\alpha\beta}\end{array}\right\}+$$
$$1+2w_iw_\alpha k\sin(k\Delta_{i\alpha})-$$
$$2w_i\cos(k\Delta_i)+2w_\alpha k\sin(k\Delta_\alpha)$$

where $\Delta_{ij}=x_i-x_j$ and $\Delta_i=x_i-y$, etc and the range of integration is $0\leq\phi\leq 2\pi$.

With wavenumber-averaging, we have $$k_m^{-1}\int\cos(kx)dk=(k_mx)^{-1}[\sin(kx)]_0^{2\pi}=\text{sinc}(k_mx)$$

$$k_m^{-1}\int k\sin(kx)dk=-\partial_x\{k_m^{-1}\int\cos(kx)dk\}=-k_m\,\text{sinc}'(k_mx)$$

$$k_m^{-1}\int k^2\cos(kx)dk=\partial_x\{k_m^{-1}\int k\sin(kx)dk\}=-k_m^2\,\text{sinc}''(k_mx)$$

where $\partial_x$ denotes differentiation with respect to x, and sinc'(x) and sinc''(x) are the first and second derivatives of the sinc function respectively, both of which are non-singular at x=0.

The wavenumber-averaged error, is given by $$\varepsilon^2 = k_m^{-1}\int \varepsilon(k)^2 dk$$
$$= w_iw_j\left\{\begin{array}{c}\text{sinc}(k_m\Delta_{ij})+\\ N\delta_{ij}\end{array}\right\}+w_\alpha w_\beta\left\{\begin{array}{c}-k_m^2\text{sinc}''(k_m\Delta_{\alpha\beta})+\\ \lambda N\delta_{\alpha\beta}\end{array}\right\}+1-$$
$$2w_iw_\alpha k_m\text{sinc}'(k_m\Delta_{i\alpha})-2w_i\text{sinc}(k_m\Delta_i)-2w_\alpha k_m\text{sinc}'(k_m\Delta_\alpha)$$
$$= w^TSw-2w^Tg+1$$

Integrating from $0\leq k\leq k_m$
Where:

$$w=\begin{pmatrix}w_i\\ w_\alpha\end{pmatrix},\ S=\begin{pmatrix}s_{ij} & s_{i\beta}\\ s_{\alpha j} & s_{\alpha\beta}\end{pmatrix},\ g=\begin{pmatrix}g_i\\ g_\alpha\end{pmatrix}$$

and $$S_{ij}=\text{sinc}(k_m\Delta_{ij})+N\delta_{ij}\ S_{i\alpha}=-k_m\,\text{sinc}'(k_m\Delta_{i\alpha})$$

$$S_{\alpha i}=-k_m\,\text{sinc}'(k_m\Delta_{i\alpha})\ S_{\alpha\beta}=-k_m^2\,\text{sinc}''(k_m\Delta_{\alpha\beta})+\lambda N\delta_{\alpha\beta}$$

$$g_i=\text{sinc}(k_m\Delta_i)$$

$$g_\alpha=\text{sinc}'(k_m\Delta_\alpha)$$

In accordance with previous notation, the argument k on δ is dropped to indicate the averaging over k. S is symmetrical and depends only on the maximum wavenumber $k_m$ and the irregular locations.

Differentiating the wavenumber-averaged error with respect to w and setting the derivatives equal to zero gives a simple linear system for the unknown weights, namely:

$$Sw=g$$

Which can be solved simply by inverting S. When the operator w is designed such that it satisfies the equation Sw=g then the equation for the wavenumber averaged error reduces to:

$$\varepsilon^2 = 1-w^Tg$$
$$= 1-g^TS^{-1}g$$

Because $$\text{sinc}(x)=\sin(x)/x=1-x^2/6+x^4/120-x^6/840+\ldots$$

$$\text{sinc}'(x)=\{\cos(x)-\text{sinc}(x)\}/x=-x/3+x^3/30-x^5/140+\ldots$$

$$\text{sinc}''(x)=\{-\sin(x)=2\,\text{sinc}'(x)\}/x=-\tfrac{1}{3}+x^2/10-x^4/28+\ldots$$

the diagonal elements of S are $1+N$ (first $n_d$ terms) and $k_m^2/3+\lambda N$ (remaining $n_g$ terms), respectively. N is essentially equivalent to the usual white noise parameter, and λ defines the relative noise level in the derivatives compared to that in the data. For large λ, the interpolated data will tend to depend on the data, rather than the derivatives.

When $k_m=0$, we have $S_{ij}=1+N\delta_{ij}$, $S_{i\alpha}=S_{\alpha i}=0$, $S_{\alpha\beta}=\lambda N\delta_{\alpha\beta}$, $g_i=1$ and $g_\alpha=0$, such that the solution is $w_i=1/(n_d+N)$ and $v_\alpha=0$, as expected.

In general, in nD, d(x) is a product of cosine functions in each direction, and each derivative datum represents a derivative of this in a specific direction, which may or may not be aligned with a principle axis. The derivative of d(x) in this direction therefore consists of a sum of terms, each one being a product of (n−1) cosines and a single sine. It is possible to extend the above treatment to a case when both the inline and crossline derivatives are used, to take into account curving of the cable. The matrices above will contain terms each of which is a linear combination of products of sinc functions and their derivatives.

It is further possible to treat the pressure and its derivative as complex numbers, thus taking into account both phase and amplitude. In this case, we consider basis functions $e^{i(kx+\phi)}$, allow the operators to be complex and use an asymmetric wavenumber range for the wavenumber averaging (i.e. averaging from $k_1$ to $k_2$ rather than 0 to $k_m$).

Figure 2:
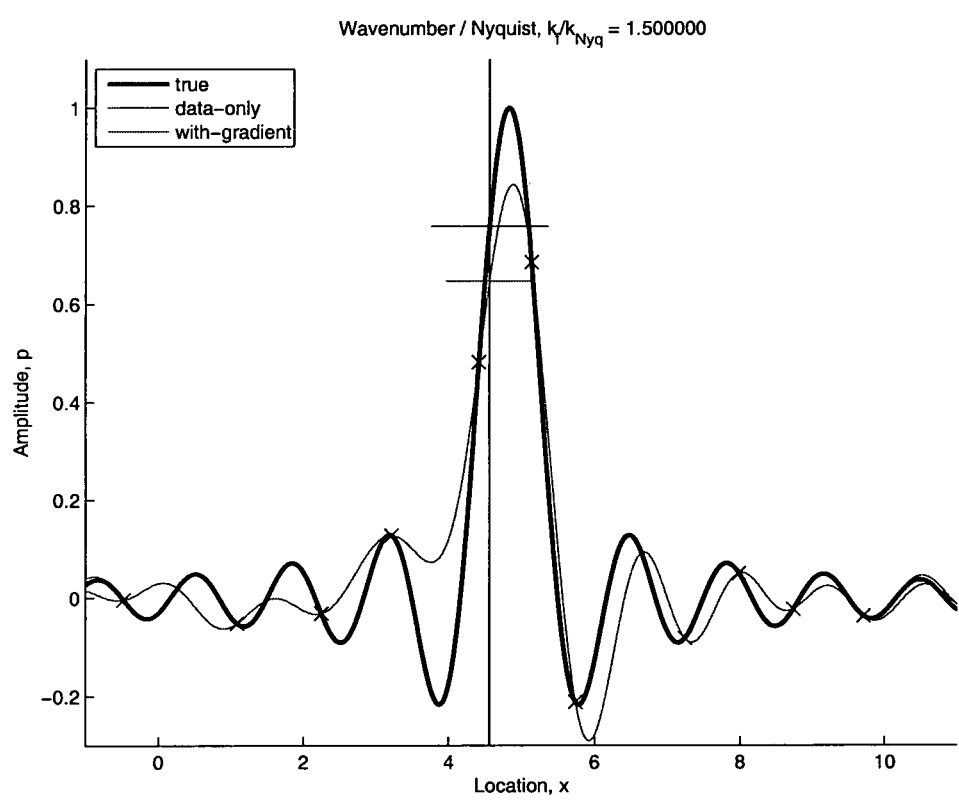
FIG. 2 shows a comparison of interpolated functions using data only and using data and gradients.

FIG. 2 compares interpolation results for data-only and with-gradient operators. The irregular locations were computed by adding random variations with a uniform distribution on the interval [−0.5, 0.5] to regular locations, x=0, 1, . . . , 10. Noise-free data and gradient information were supplied at the same locations, indicated by the markers. The true curve shows the underlying function being interpolated, which is a sinc function with maximum wavenumber ($k_f$) equal to $1.5k_{Nyq}$, where $k_{Nyq}$ is the Nyquist corresponding to the average sample interval. The peak of the sinc function is located at a random location taken from a uniform distribution on the interval [4.5, 5.5]. The reason for using a random location for this peak is to avoid biases in the ensemble averaging (described later) associated with a correspondence between the peak location and regular data locations.

Interpolation operators were designed using $k_m=1.6k_{Nyq}$. The "data only" curve shows the interpolating function for the data-only operator. As expected, there are significant errors because the data are aliased. Note though that the interpolating function does interpolate the supplied data. The "with-gradient" curve is the corresponding function for the with-gradient operator, and it is near perfect.

Figure 3:
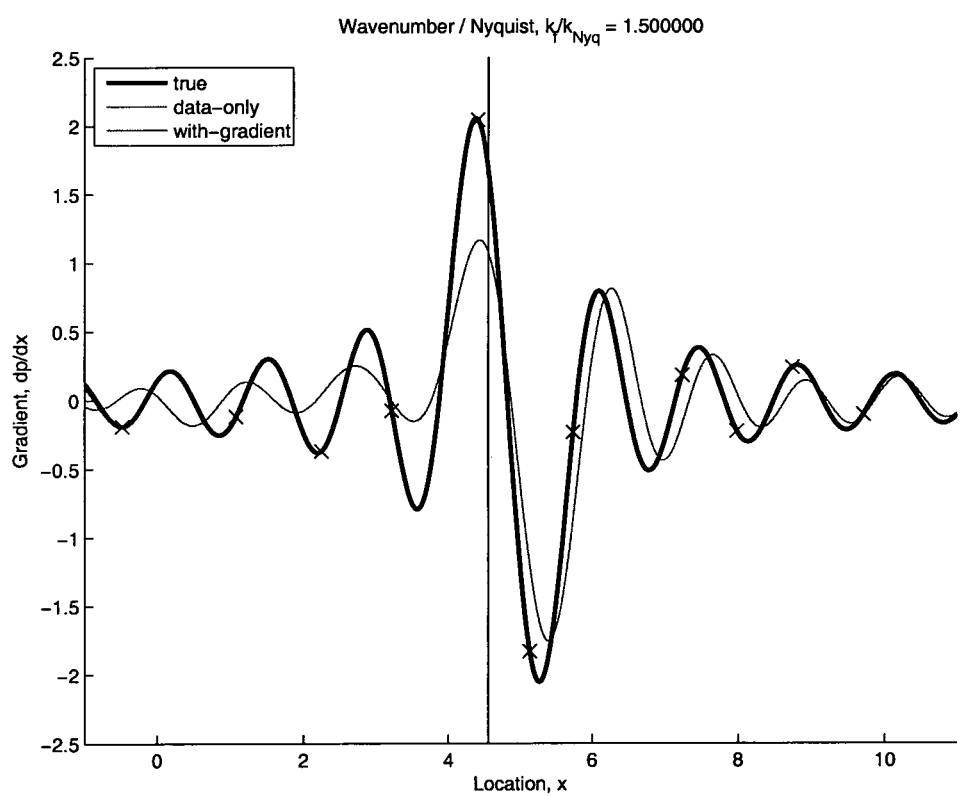
FIG. 3 shows a comparison of gradients of interpolated functions using operators calculated using data only and data with gradients.

FIG. 3 shows the gradients of the interpolated functions. The "true" curve is the true gradient and the markers show the supplied gradient information. The "data only" and "with-gradient" curves show the gradients of the interpolated functions for the data-only and with-gradient algorithms respectively. The "data only" curve shows significant error because it does not use the gradient information. The "with-gradient" curve does use the gradient information and properly interpolates the gradients.

In order to remove the impact of having a specific set of irregular locations on the results, ensemble averaging was performed. A specific output location, indicated by the vertical bars in FIGS. 2 and 3, was chosen. In order to avoid bias, the output location was chosen to be displaced from the peak of the sinc function by a random amount with uniform distribution on the interval [−0.5, 0.5]. The errors at this location, indicated by the horizontal bars in FIG. 2, were computed for each of the 1000 instances in the ensemble and are plotted in FIG. 4 for the first 200 instances. The benefits of using the gradient information are clear.

Figure 4:
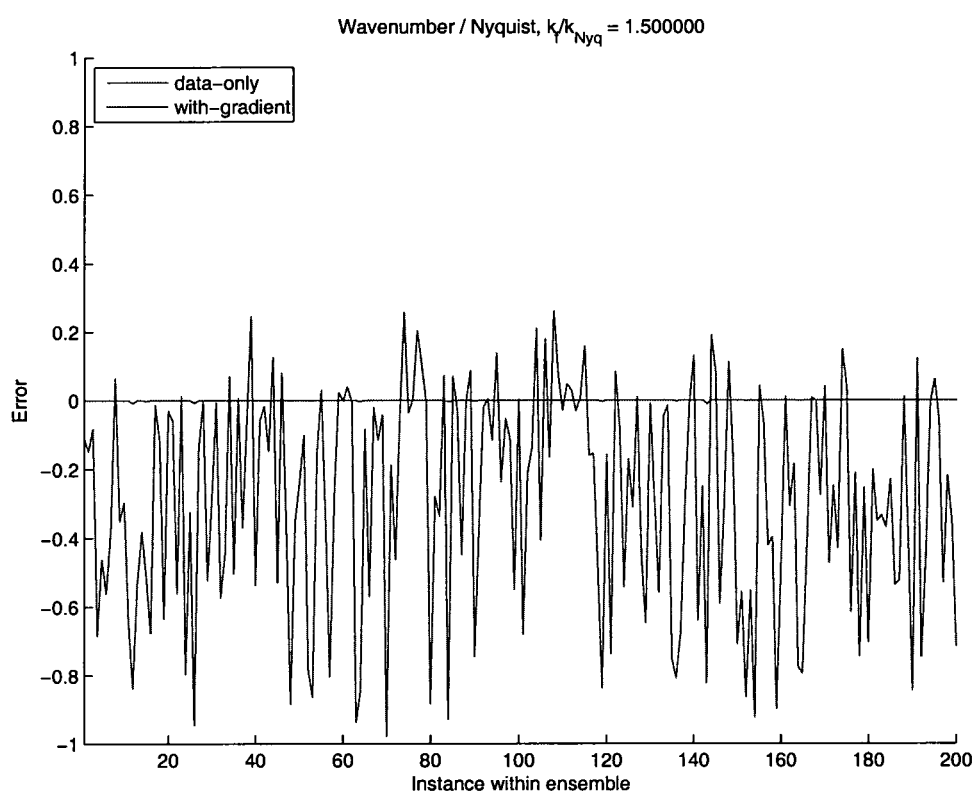
FIG. 4 shows a comparison of errors within an ensemble for data only and data with gradient operators.

It should be noted that the errors plotted in FIG. 4 (actual errors) are not the same as the error, $\epsilon$, defined above. In particular, the actual errors depend on the function being interpolated, whereas $\epsilon$ depends only on the maximum wavenumber used for the operator design. The reason for using actual errors in this example is that, when the data or gradients are noisy, the actual errors give a true measure of the error in the interpolated function. In contrast, $\epsilon$ only knows about the noise levels in the data and gradients through the supplied values for the noise variances (N and $\lambda$), which may be in error.

Figure 5:
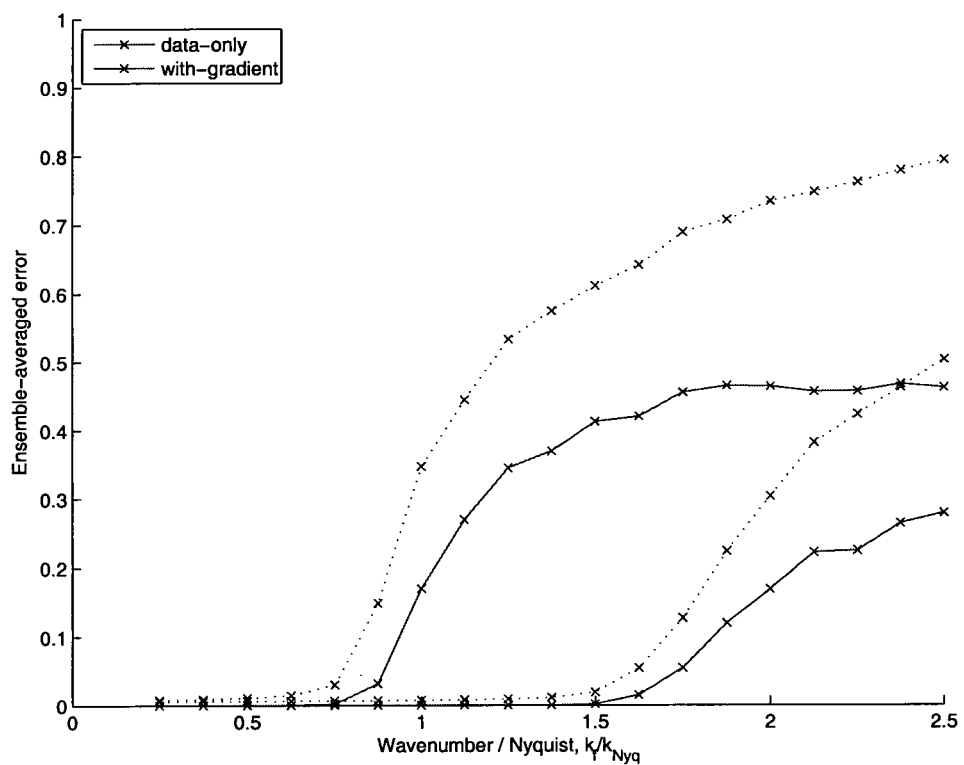
FIG. 5 shows the dependence of ensemble averaged errors on the maximum wavenumber of the function being interpolated.

A single measure of the error can be derived by computing the rms error for the ensemble. FIG. 5 shows this error plotted against $k_f/k_{Nyq}$, with $k_m=1.1k_f$ in all cases. Solid and dotted curves show the actual and theoretical errors (e), respectively, and the different curves indicate the type of operator. In this noise-free case, both error measures are valid and they are qualitatively the same. The differences in magnitude relate to the specific choice of function being interpolated, and its relationship to the output location, for the actual errors case.

The errors are very small for both types of operator until $k_f$ approaches $k_{Nyq}$. At that point, the errors for the data-only operator grow rapidly. However, the errors for the with-gradient operator remain small until twice this wavenumber is reached, demonstrating that using noise-free gradient information doubles the maximum wavenumber that can be interpolated. Note that the horizontal axis shows $k_f/k_{Nyq}$ rather than $k_m/k_{Nyq}$. Had the errors been plotted against $k_m/k_{Nyq}$, then the points at which errors become significant would be closer to 1 and 2 for the data-only and with-gradient operators, respectively.

Figure 6:
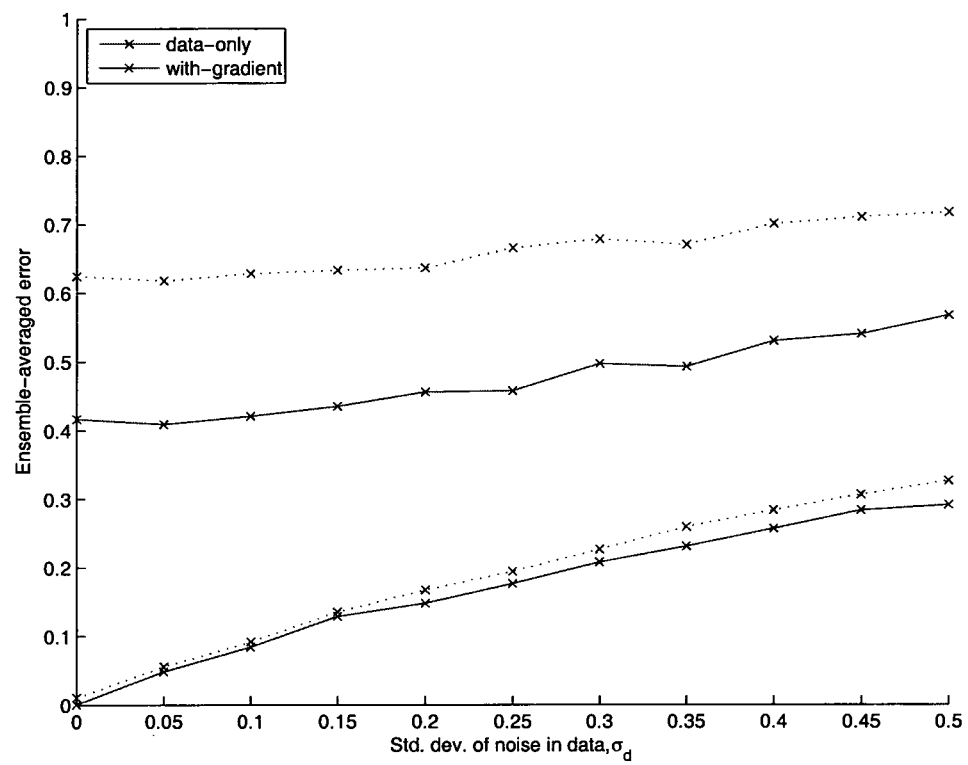
FIG. 6 illustrates the dependence of ensemble averaged errors on the noise levels in the data when the gradients are noise free.

The impact of noise on the accuracy of the interpolation is extremely important. FIG. 6 shows the dependence of the interpolation error on the standard deviation of the noise level in the data, $\sigma_\phi$ for $k_f=1.5k_{Nyq}$. The noise was random and Gaussian with zero mean. The gradients are noise-free. In all cases, the noise variance was assumed known for the operator design, such that the operator should be optimal in terms of $\epsilon$.

As expected, the interpolation error increases as the noise increases and the gradient information provide a significant reduction in the error.

Figure 7:
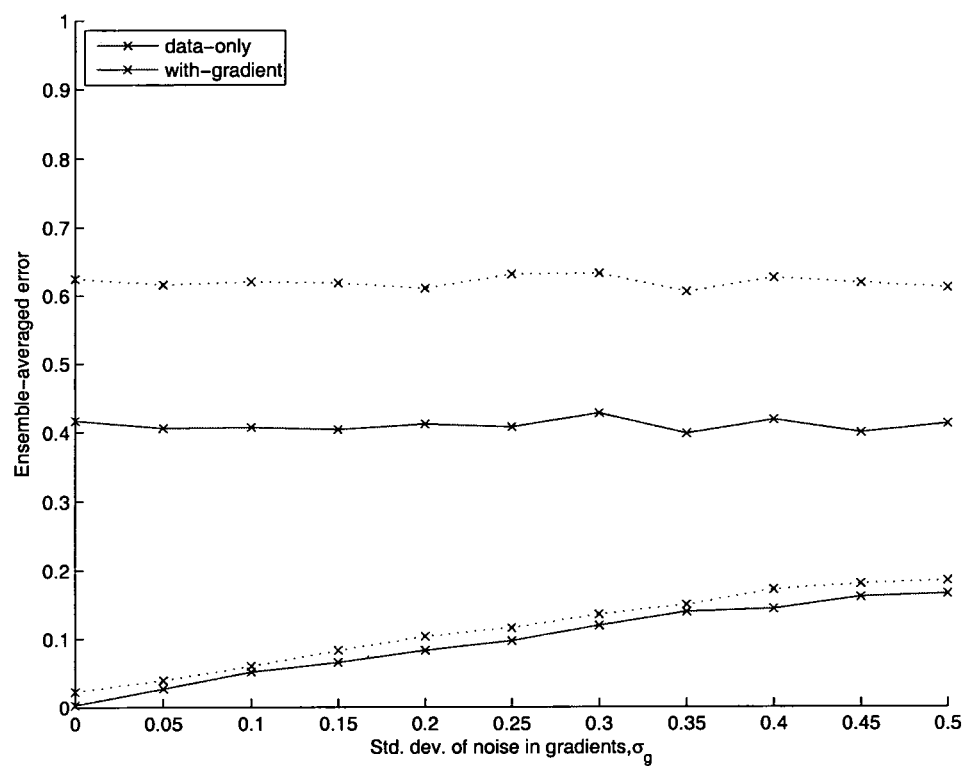
FIG. 7 shows the dependence of ensemble averaged errors on the noise levels in the gradients when the data is noise free.

FIG. 7 shows the corresponding graph when the errors are in the gradients, rather than the data. The error for the data-only operator is constant. This is to be expected because the gradients are not used. The error for the with-gradient operator grows with increasing noise level, but remains below that for the data-only operator. If the gradients are made very noisy, then the errors would become equal because the gradients would not be used in the interpolation. This last statement assumes that it is known that the gradients are very noisy, otherwise the with gradient operator may be worse than the data-only operator because the former operator would try too hard to honour the gradients.

Figure 8:
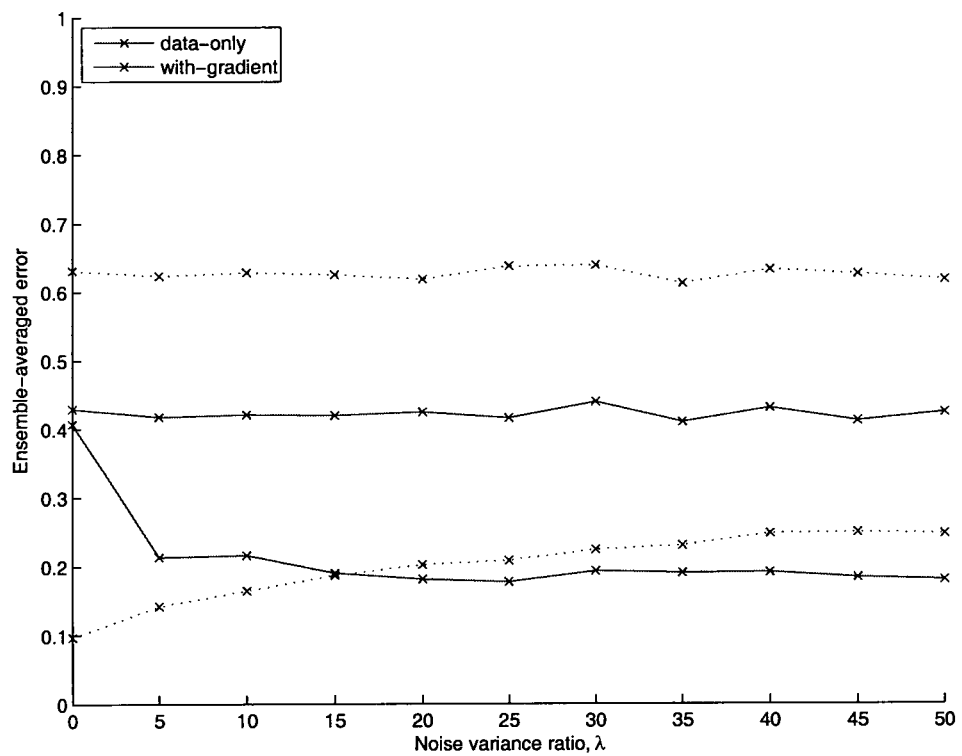
FIG. 8 shows the dependence of ensemble averaged errors on the ratio of the gradient and data noise variances used for the operator design.

In order to study the consequence of not knowing the noise level in the gradients, noisy data and gradients were interpolated using a range of noise variances in the operator design. The results are shown in FIG. 8. The data and gradients had noise standard deviations of $\sigma_d=0.1$ and $\sigma_g=0.4$ respectively. The operator design used the appropriate noise variance for the data (N=0.01), and the ratio of the gradient variance to the data variance ($\lambda$) was varied and is plotted on the horizontal axis. The theoretical optimum is $\lambda=(\sigma_g/\sigma_d)^2=16$.

The dotted curves in the figure do not give a true measure of the error in this case, because they assume the noise levels in the data and gradients are equal to those used for the operator design. These curves are essentially a repeat of those in FIG. 7, except that now the data contain noise, and the horizontal axis is proportional to $\sigma^2_g$.

The actual errors, shown by the solid curves, do however give an indication of the performance of the operator as a function of the specified noise levels. The error for the data-only operator is constant because this operator does not depend on $\lambda$. The performance of the with-gradient operator also appears to be reasonably insensitive to $\lambda$, provided it is not too small. For very small $\lambda$, the gradients are overused and, because they are noisier than the data, the interpolation error approaches that for the data-only operator. Had the true noise ratio been made greater, the interpolation error for small $\lambda$ would become greater than that for the data-only operator. It is therefore important not to underestimate the noise level in the gradients when designing the operator.

Figure 9:
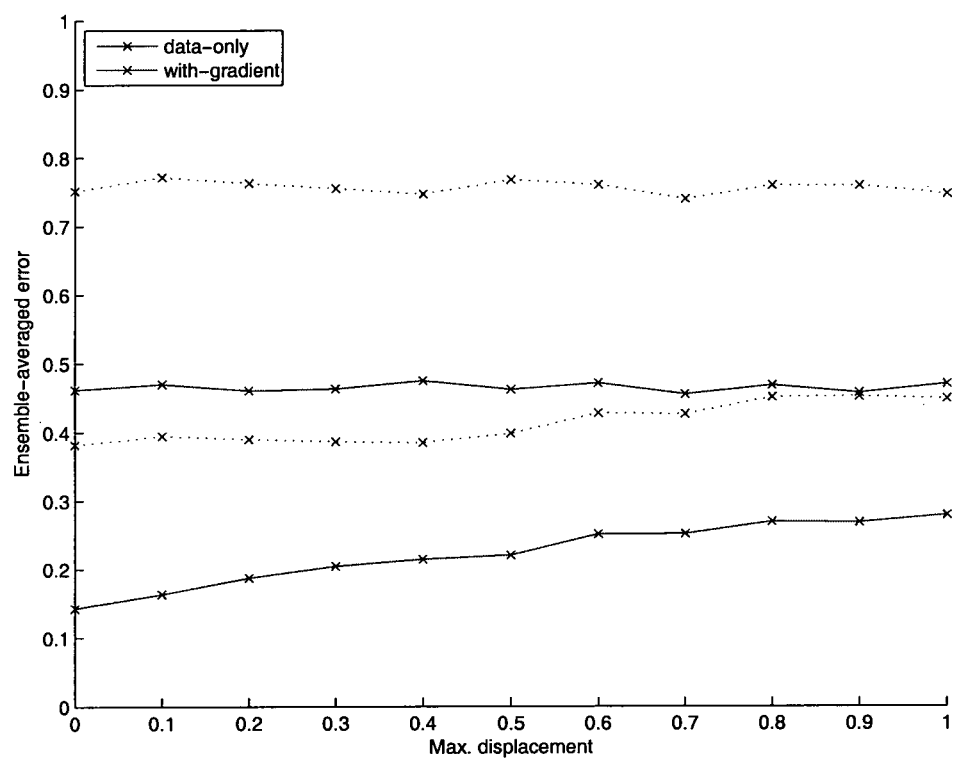
FIG. 9 shows the dependence of ensemble averaged errors on the degree of irregularity of the locations for the data and gradients.

In practice; there is some control over the sampling of the data and gradients. It is interesting, therefore, to consider how the degree of irregularity affects the interpolation error. FIG. 9 shows errors plotted against the maximum deviation of the irregular locations from their nominal, regular locations. In all the previous figures, this maximum deviation was 0.5. These errors are for the noise-free case, but with $k_f=2.2k_{Nyq}$, such that the function being interpolated is aliased even for the with-gradient operator. Note that the output location varies randomly, such that it is not biased with respect to the regular locations.

The performance of the data-only operator is insensitive to the degree of irregularity over the range considered. The performance of the with-gradient operator, however, degrades significantly as the irregularities are increased. This trend is indicated by both types of error measure, and suggests that when gradients are used for the operator design, the sampling should be made as regular as possible.

Moveout Correction

It is common to apply moveout correction to seismic data before interpolation in order to reduce aliasing, and then to remove this correction afterwards. Whilst this process is straightforward for interpolation algorithms that involve only data, it is more complicated for algorithms that make use of spatial derivatives of those data. It is not correct simply to apply moveout correction to the derivatives, because this does not yield the derivative of the moveout-corrected data. Moveout-correction and differentiation do not, in general, commute.

Suppose we have recorded data p(x, y, t), where x and y are the components of the offset vector, and t is two-way travel time at that offset. Suppose also that we have the spatial derivative of those data, $p_x(x, y, t)$. The moveout-corrected data, $M(p)(x, y, t_0)$ are given by $$M(p)(x,y,t_0)=p(x,y,t_m(t_0,x,y))$$

where $t_0$ is the zero-offset time, and $t_m(x, y, t_0)$ may be the moveout function, which gives the time at offset (x, y) corresponding to $t_0$. However, the moveout function need not move the data completely to zero offset. As the purpose is simply to reduce the slope of the events to avoid aliasing, a very approximate moveout function can be used, or one which under-corrects the data (ie the velocity function is slightly faster than for zero offset correction. The above formula assumes that moveout correction does not include stretch compensation, which would bring in an extra factor of $\partial t_m / \partial t_0$.

The spatial derivative of $M(p)(x, y, t_0)$ is given by $$M(p)_x(x, y, t_0) = p_x(x, y, t_m(x, y, t_0)) +$$
$$p_t(x, y, t_m(x, y, t_0))t_{m,x}(x, y, t_0)$$
$$= M(p_x)(x, y, t_0) + M(p_t)(x, y, t_0)t_{m,x}(x, y, t_0)$$

The first term on the right is simply the moveout-corrected derivative. The second term is a correction to this that depends on both the time-derivative of the recorded data and the spatial derivative of the moveout function. Fortunately, both of these are generally easy to compute because the data are well-sampled in time, and the moveout function is an analytical function of offset. If the moveout correction is perfect, in the sense that it renders the data independent of offset, then the second term cancels the first to yield a zero derivative. In general, however, there will be inaccuracies in the moveout function, and moveout correction will create offset-dependent wavelet stretch, such that the derivative will be non-zero.

Hyperbolic Moveout

For the specific case of hyperbolic moveout, we have $$t^2_m(x,y,t_0)=t^2_0+(x^2+y^2)/v^2(t_0)$$

where $v(t_0)$ is the rms velocity. Differentiating this gives $$t_{m,x}=x/v^2 t_m$$

in which it should be noted that the numerator is the component of the offset in the direction in which the gradient is required.

Linear Moveout

The corresponding equations for linear moveout are $$t_m(x,y,t_0)=t_0+\sqrt{(x^2+y^2)}/v(t_0)$$

and $$t_{m,x}=x/(v\sqrt{(x^2+y^2)})$$

Figure 10:
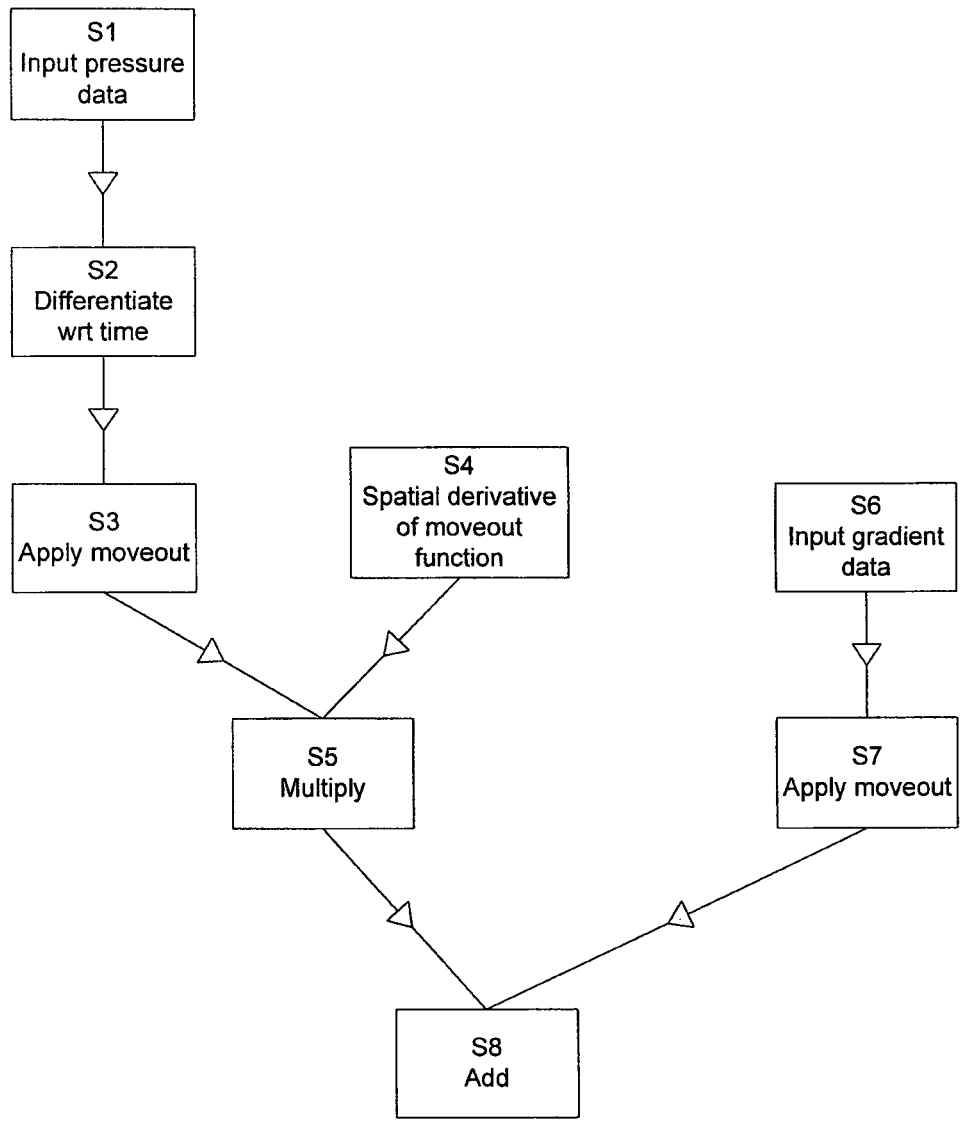
FIG. 10 is a flow diagram illustrating a method for obtaining gradients of moveout corrected data.

FIG. 10 illustrates a flow diagram for the calculation of the gradient of the moveout corrected data.

In step S1, the pressure data p(x, y, t) is input and in step S2 the time derivative $p_t(x, y, t)$ is computed. In step S3, the moveout correction is applied to $p_t(x, y, t)$ to give $M(p_t)(x, y, t_0)$. In step S4, the spatial derivative $t_{m,x}(x, y, t_0)$ of the moveout function $v(t_0)$ is calculated using the hyperbolic formula.

In step S5, the results of steps S3 and S4 are multiplied. In step S6, the pressure gradient data is input and the moveout correction is applied to give $M(p_x)(x, y, t_0)$. In step S7, the results of steps S5 and S6 are added to give the gradients of the moveout corrected pressure values.

Figure 11:
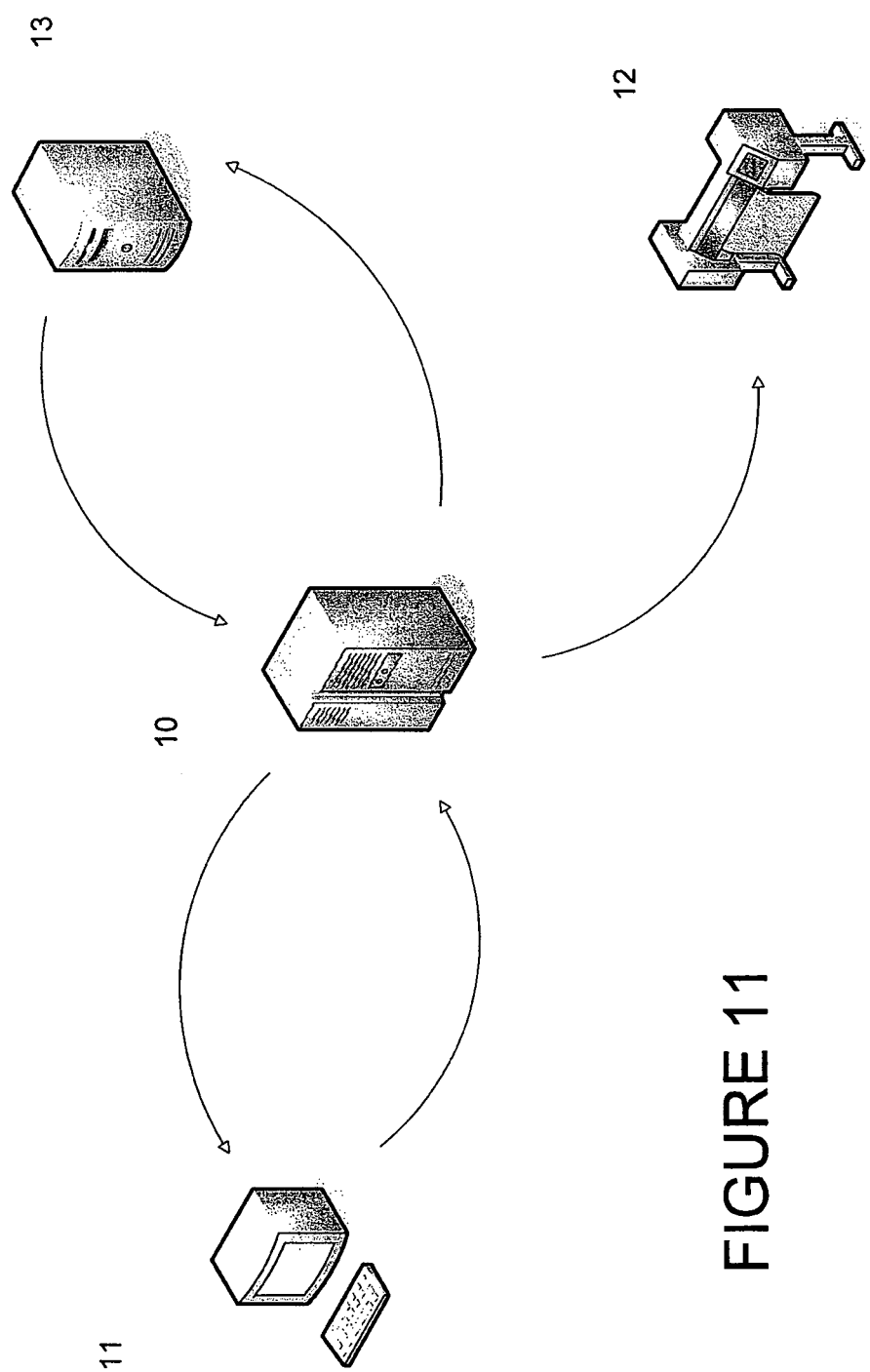
FIG. 11 illustrates a system for carrying out the method of the invention.

FIG. 11 illustrates a typical system for processing seismic data. Acquired seismic data is stored in a storage means 13, which may be a hard drive, tape or disk or any other form of data storage. A user terminal 11 is used by an operator to input parameters and instructions to build a suitable processing flow for data, which is submitted to a processor 10, which loads the appropriate data from the storage means 13 and carries out the processing steps in accordance with the user's instructions. The processor 10 then outputs processed data to the storage means 13 (or to a separate storage device). The processor may also send results to the user terminal 11, and/or a notification that the processing is complete. The processing means 10 may also send output data to a printer 12.

The present invention has been described particularly with regard to cross line interpolation of marine seismic data which is the most advantageous application of the invention. The invention may be applied to interpolation along a streamer although cable noise makes the results less accurate. Also, there are fewer physical and cost restraints on increasing the sampling interval along a streamer in the acquisition by reducing the distance between sensors. However, there are possible applications such as in reprocessing of poorly sampled data or to interpolate traces that are missing due to defective sensors. Also, though every attempt is made to ensure that detectors are regularly spaced along the streamers, irregularities can occur which may be significant. As well as defective detectors, it may be necessary to skip a detector to insert some other piece of equipment on the cable.

The present invention may also be applied to seismic data recorded on land environment or an ocean bottom environment although again, in these environments there are fewer constraints on placing lines of sensors closer together. The invention may also be used to "regularise" data i.e. to take irregularly spaced data and interpolate to shift the data points to be regularly spaced. The sampling is not necessarily increased but the sample intervals are made regular.

In the foregoing description, for the purposes of illustration, various methods and/or procedures were described in a particular order. It should be appreciated that in alternate embodiments, the methods and/or procedures may be performed in an order different than that described. It should also be appreciated that the methods described above may be performed by hardware components and/or may be embodied in sequences of machine-executable instructions, which may be used to cause a machine, such as a general purpose or special-purpose processor or logic circuits programmed with the instructions, to perform the methods. These machine-executable instructions may be stored on one or more machine readable media, such as CD-ROMs or other type of optical disks, floppy diskettes, ROMs, RAMS, EPROMs, EEPROMs, magnetic or optical cards, flash memory, or other types of machine-readable media suitable for storing electronic instructions. Merely by way of example, some embodiments of the invention provide software programs, which may be executed on one or more computers, for performing the methods and/or procedures described above. In particular embodiments, for example, there may be a plurality of software components configured to execute on various hardware devices. Alternatively, the methods may be performed by a combination of hardware and software.

Hence, while detailed descriptions of one or more embodiments of the invention have been given above, various alternatives, modifications, and equivalents will be apparent to those skilled in the art without varying from the scope of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

The invention claimed is:

1. A method for processing seismic data, comprising:
receiving the seismic data; wherein the seismic data comprise known values of pressure and spatial derivatives of pressure at a plurality of irregularly spaced locations along a direction of interpolation, and wherein the known values of pressure and spatial derivatives of pressure are determined from measurements made at the plurality of irregularly spaced locations;
spatially interpolating pressure values using the known pressure and spatial derivatives of pressure, wherein the spatially interpolating pressure values comprises applying an interpolation operator calculated by assuming that an interpolated pressure value comprises a linear combination of the known pressure values at locations $x_i$, and the known spatial derivatives at locations $x_i$, with operator coefficients $w_i$, and $w_\alpha$ respectively, and calculating the coefficients by minimising an error function; and
using the spatially interpolated pressure values to determine physical properties of the earth's interior.

2. The method of claim 1, wherein the known pressure values are derived from hydrophone readings, and the known spatial derivatives of pressure are derived from measurements of particle velocity or acceleration.

3. The method of claim 1, wherein minimising an error function comprises using a least squares method.

4. The method of claim 1, wherein the interpolation operator includes a factor relating to a noise level in the known values of pressure and the known spatial derivatives of pressure.

5. The method of claim 1, wherein the direction of interpolation is substantially perpendicular to a cable connecting a plurality of geophones/hydrophones.

6. The method of claim 1, wherein the seismic data is marine seismic data acquired using a plurality of substantially parallel streamers having hydrophones spaced along each streamer, and the method is used to interpolate data points between the streamers.

7. The method of any one of claim 1, wherein the known pressure data is in the form of raw shot gathers.

8. The method of any one of claim 1, wherein the known spatial derivatives are calculated from raw measurements of particle velocity or acceleration.

9. The method of claim 1, wherein the known values of pressure and spatial derivatives of pressure comprise moveout corrected values of pressure and spatial derivatives of moveout corrected pressure values.

10. The method of claim 9, comprising calculating the spatial derivatives of moveout corrected pressure values from the known values of pressure and spatial derivatives of pressure by:
applying a moveout correction function to the known spatial derivative data; and
adding a correction term dependent on a moveout corrected time-derivative of the known pressure data and a spatial derivative of the moveout correction function.

11. The method of claim 10, comprising the steps of:
a) computing a time-derivative of the known pressure data by differentiation of the known pressure data;
b) applying the moveout correction function to the time-derivative of the known pressure data;
c) computing the spatial derivative of the moveout function;
d) multiplying the results of steps (b) and (c);
e) applying the moveout correction function to the spatial derivative data; and
f) adding the results of steps (d) and (e) to obtain the spatial derivatives of moveout corrected pressure values.

12. The method of claim 10, wherein the moveout function is a hyperbolic function.

13. An apparatus for spatially interpolating pressure values of seismic data, comprising:
a processor configured to:
receive values of pressure and spatial derivatives of pressure measured at a plurality of irregularly spaced locations along a direction of interpolation;
via a processor, interpolate pressure values along the direction of interpolation from the measured values of pressure and spatial derivatives of pressure, wherein the interpolation of the pressure values along the direction of interpolation comprises applying an interpolation operator calculated by assuming that an interpolated pressure value comprises a linear combination of the measured pressure values at locations $x_i$, and the measured spatial derivatives at locations $x_\alpha$, with operator coefficients $w_i$, and $w_\alpha$, respectively, and calculating the coefficients by minimising an error function; and
process physical properties of the earth's interior using the interpolated pressure values.

14. The apparatus of claim 13, comprising a storage means for storing recorded seismic data comprising hydrophone and geophone readings, wherein the measured pressure values are derived from the hydrophone readings, and the measured spatial derivatives of pressure are derived from geophone measurements of particle velocity or acceleration.

15. The apparatus of claim 13, wherein the operator includes a factor relating to a noise level in the measured values of the pressure and spatial derivatives of pressure.

16. The apparatus of claim 13, wherein the measured values of pressure and spatial derivatives of pressure comprise moveout corrected values of pressure, and spatial derivatives of moveout corrected pressure values.

17. The apparatus of claim 16, wherein the processor is configured to calculate the spatial derivatives of moveout corrected pressure values from the measured values of pressure and spatial derivatives of pressure by:
applying a moveout correction function to the spatial derivative data; and
adding a correction term dependent on a moveout corrected time-derivative of the pressure data and a spatial derivative of the moveout correction function.

18. The apparatus of claim 17, wherein the processor is configured to calculate the spatial derivatives of moveout corrected pressure values from the measured values of pressure and spatial derivatives of pressure by:
a) computing a time-derivative of the pressure data by differentiation of the measured pressure data;
b) applying the moveout correction function to the time-derivative of the pressure data;

c) computing the spatial derivative of the moveout function;
d) multiplying the results of steps (b) and (c);
e) applying the moveout correction function to the spatial derivative data; and
f) adding the results of steps (d) and (e) to obtain the spatial derivatives of moveout corrected pressure values.

* * * * *